(12) United States Patent
Kashimoto

(10) Patent No.: US 9,071,680 B2
(45) Date of Patent: Jun. 30, 2015

(54) INFORMATION COMMUNICATION APPARATUS HAVING INDICATOR DISPLAY FUNCTION, AND INDICATOR DISPLAY METHOD EXECUTED BY THE INFORMATION COMMUNICATION APPARATUS

(75) Inventor: Kazutoshi Kashimoto, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 322 days.

(21) Appl. No.: 13/700,815

(22) PCT Filed: May 15, 2012

(86) PCT No.: PCT/JP2012/003169
§ 371 (c)(1),
(2), (4) Date: Nov. 29, 2012

(87) PCT Pub. No.: WO2012/164841
PCT Pub. Date: Dec. 6, 2012

(65) Prior Publication Data
US 2013/0143604 A1 Jun. 6, 2013

(30) Foreign Application Priority Data

May 27, 2011 (JP) ................................. 2011-119644

(51) Int. Cl.
| | |
|---|---|
| *G09G 5/377* | (2006.01) |
| *H04W 4/00* | (2009.01) |
| *H04M 1/247* | (2006.01) |
| *H04M 1/725* | (2006.01) |
| *G06F 3/041* | (2006.01) |

(52) U.S. Cl.
CPC ............. *H04M 1/2478* (2013.01); *G09G 5/377* (2013.01); *G06T 2207/20221* (2013.01);

(Continued)

(58) Field of Classification Search
USPC .......................................... 345/157–158, 162
See application file for complete search history.

(56) References Cited

U.S. PATENT DOCUMENTS

| | | | | |
|---|---|---|---|---|
| 5,982,377 A | * | 11/1999 | Yamashita et al. | 345/427 |
| 8,850,045 B2 | * | 9/2014 | Berg et al. | 709/229 |

(Continued)

FOREIGN PATENT DOCUMENTS

| | | |
|---|---|---|
| JP | 2007-300579 | 11/2007 |
| JP | 2007-536665 | 12/2007 |

(Continued)

OTHER PUBLICATIONS

International Search Report issued Jul. 24, 2012 in corresponding International Application No. PCT/JP2012/003169.

*Primary Examiner* — Yuwen Pan
*Assistant Examiner* — Zhitong Chen
(74) *Attorney, Agent, or Firm* — Wenderoth, Lind & Ponack, L.L.P.

(57) ABSTRACT

An information communication apparatus having a display section, includes: a sensor section used for communication between an information communication terminal and another apparatus; a terminal information storing section configured to store information about a position of the sensor section in the information communication terminal and information about a position and a size of the display section in the information communication terminal; and a control section configured to calculate a relative positional relationship of the sensor section and the display section, based on the information stored in the terminal information storing section, generate an indicator that allows the position of the sensor section to be specified, and display the indicator on the display section.

9 Claims, 17 Drawing Sheets

(52) U.S. Cl.
CPC ..... *H04W 4/008* (2013.01); *G06T 2207/20212* (2013.01); *G06T 2219/2008* (2013.01); *G06T 2219/2004* (2013.01); *H04M 1/7253* (2013.01); *H04M 2250/12* (2013.01); *G06F 3/041* (2013.01)

(56) References Cited

U.S. PATENT DOCUMENTS

| | | | | |
|---|---|---|---|---|
| 2007/0124503 | A1* | 5/2007 | Ramos et al. | 709/248 |
| 2008/0093447 | A1* | 4/2008 | Johnson et al. | 235/383 |
| 2008/0252416 | A1* | 10/2008 | Posch et al. | 340/10.1 |
| 2010/0190537 | A1* | 7/2010 | Fujii | 455/575.4 |
| 2012/0274560 | A1* | 11/2012 | Caritu et al. | 345/158 |

FOREIGN PATENT DOCUMENTS

| | | |
|---|---|---|
| JP | 2009-33590 | 2/2009 |
| JP | 2010-97340 | 4/2010 |
| JP | 2010-520688 | 6/2010 |
| WO | 2005/106767 | 11/2005 |
| WO | 2008/107138 | 9/2008 |

\* cited by examiner (a)    (b)

(a)    (b)

INFORMATION COMMUNICATION APPARATUS HAVING INDICATOR DISPLAY FUNCTION, AND INDICATOR DISPLAY METHOD EXECUTED BY THE INFORMATION COMMUNICATION APPARATUS

BACKGROUND OF THE INVENTION

1. Technical Field

The present invention relates to an electronic apparatus (hereinafter, referred to as an information communication apparatus) that performs information communication, such as a mobile phone or a smartphone, and more particularly, to a technique of executing communication between apparatuses by overlapping an apparatus and another apparatus as a communication target with each other.

2. Background Art

In recent years, data is often communicated between apparatuses by wirelessly connecting a plurality of apparatuses to each other. For example, audio-visual (AV) digital home electrical appliances (television, PC, audio system, HDD recorder, etc.) are allowed to perform mutual communication by techniques such as DLNA (Digital Living Network Alliance) or Bluetooth (registered trademark). Owing to such techniques, digital contents such as, for example, music, pictures, and moving images can be shared seamlessly among home electrical appliances, PC, and mobile apparatuses.

For connecting apparatuses to perform mutual communication, it is necessary to specify (or authenticate) a communication target. As an example of techniques for specifying such a communication target, Patent Literature 1 discloses a technique of determining whether or not to allow connection between apparatuses by determining the relevance of a value inputted to a sensor provided in each apparatus.

CITATION LIST

Patent Literature

[PTL 1] Japanese Laid-Open Patent Publication No. 2010-097340
[PTL 2] Japanese Laid-Open Patent Publication No. 2007-300579

Problems to be Solved by the Invention

However, in the conventional technique disclosed in Patent Literature 1, since overlapping operation of two apparatuses to perform mutual communication is supposed to be arbitrarily conducted by a user, the positions of sensors of the overlapped apparatuses can be displaced from each other. If input operation is performed in the state in which the sensor positions of the apparatuses are displaced, values inputted to the sensors differ from each other, therefore causing a problem that the apparatuses cannot be accurately specified (or authenticated).

SUMMARY OF THE INVENTION

An object of the present invention is to provide an information communication apparatus that allows the sensor position of the apparatus and the sensor position of a target apparatus to be overlapped with minimum displacement therebetween, and an indicator display method and a program executed by the information communication apparatus to performs such overlapping operation.

Solution to the Problems

An information communication apparatus having a display section, according to one aspect of the present invention, includes: a sensor section used for communication between an information communication terminal and another apparatus; a terminal information storing section configured to store information about the position of the sensor section in the information communication terminal and information about the position and the size of the display section in the information communication terminal; and a control section configured to calculate the relative positional relationship of the sensor section and the display section, based on the information stored in the terminal information storing section, generate an indicator that allows the position of the sensor section to be specified, and display the indicator on the display section.

Advantageous Effects of the Invention

Owing to the above configuration, it becomes possible to present, to a user, an indicator that allows the position of the sensor section in the information communication apparatus to be specified, thereby easily realizing optimum position alignment of information communication apparatuses between the sensor position of the user's apparatus and the sensor position of a target apparatus when the user performs mutual communication.

DESCRIPTION OF EMBODIMENTS

Figure 1:
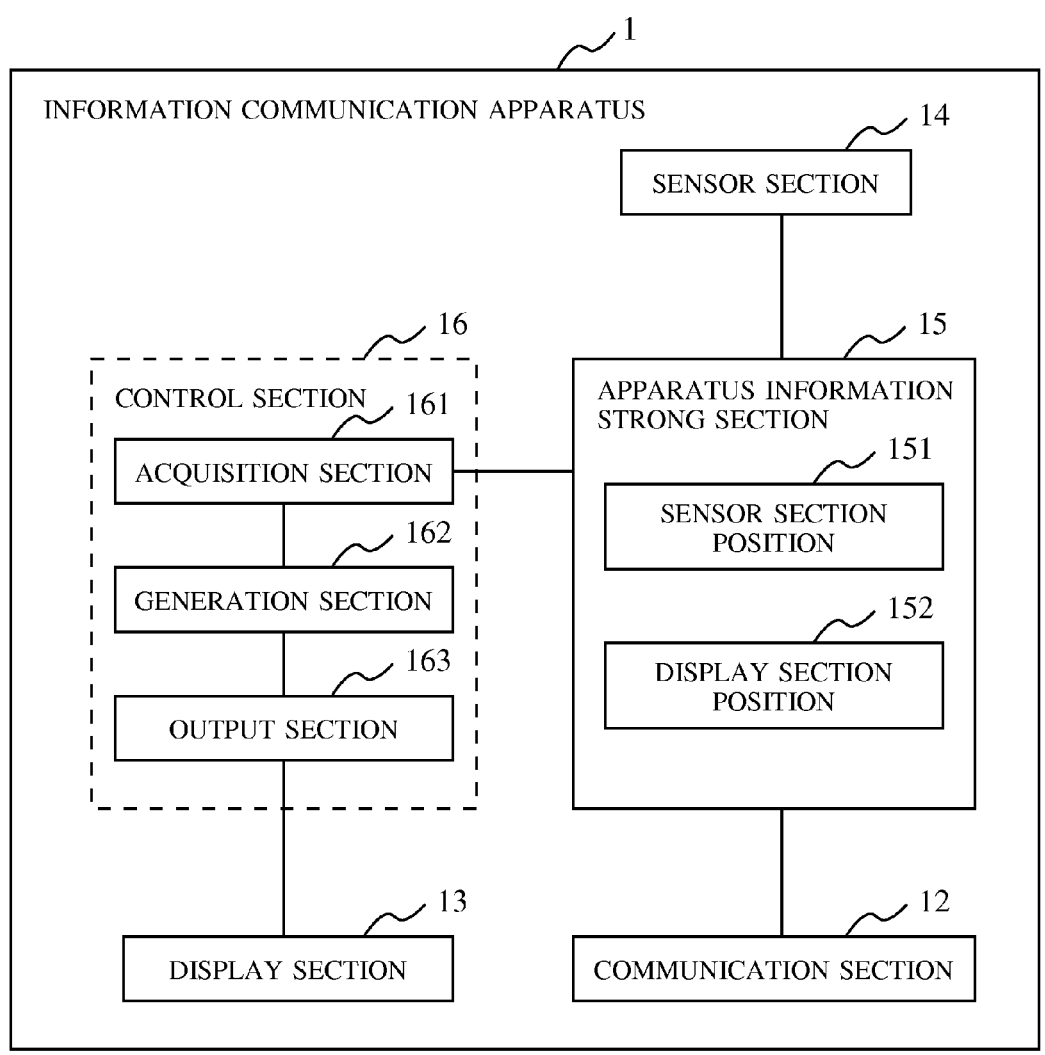
FIG. 1 is a diagram showing a configuration of an information communication apparatus 1 according to a first embodiment of the present invention.

<Knowledge as a Basis of the Present Invention>

In a technique of determining whether or not to allow connection between apparatuses by determining the relevance of a value inputted to a sensor provided in each apparatus, if the positions of the sensors of the overlapped apparatuses are displaced from each other, the apparatuses cannot be accurately specified (or authenticated). Particularly, in the case where two apparatuses are overlapped with each other and shaken, if the two overlapped apparatuses are subjected to shake or the like in the state in which the sensor positions thereof are displaced from each other, values inputted to the sensors of the two apparatuses can differ from each other. In order to reduce the difference between the values, it is necessary to overlap the apparatuses so as to make their sensor positions align with each other as accurately as possible.

For example, in the case where the sizes of apparatuses to perform mutual communication are different as in the case of a smartphone and a tablet PC, in order to accurately overlap the apparatuses, it is necessary to correctly grasp the sensor position of the apparatuses.

In addition, in the future, it is expected that contactless communication between apparatuses is increasingly prevailing by, for example, providing a contactless IC chip compliant with a short-range wireless communication technique (for example, NFC: Near Field Communication) in apparatuses. Even in the case of performing mutual communication using such a short-range wireless communication technique, it is considered, after all, that a method of specifying a communication target by overlapping the apparatuses with each other is mainly employed. In the case where short-range wireless communication is performed by using a sensor such as a contactless IC chip, since the communication enabled range of the sensor is extremely narrow, it is especially important to overlap the sensor positions of the apparatuses with high accuracy.

It is noted that Patent Literature 2 cited as conventional art performs control so as to overlap the sensor positions by using a camera device. By realizing overlapping operation of the sensor positions of the two apparatuses without such a camera device, it becomes possible to reduce restriction on a target apparatus or usage condition, thereby realizing wider utilization.

<Method the Present Inventors Focused on>

Accordingly, the present inventors have focused on the fact that most information communication apparatuses have a display section, and have newly devised a method of displaying an indicator that allows the sensor positions of two apparatuses to perform mutual communication to be specified, on the screen of the display section, thereby guiding a user to make an optimum overlapped state of the two apparatuses.

Various aspects of the present invention based on the newly devised method are as follows.

<Summary of Aspects of the Invention>

The first aspect of the present invention is an information communication apparatus having a display section, the information communication apparatus including: a sensor section used for communication between the information communication apparatus and another apparatus; an apparatus information storing section configured to store information about the position of the sensor section in the information communication apparatus and information about the position and the size of the display section in the information communication apparatus; and a control section configured to calculate the relative positional relationship of the sensor section and the display section, based on the information stored in the apparatus information storing section, generate an indicator that allows the position of the sensor section to be specified, and display the indicator on the display section.

According to the first aspect, it becomes possible to present, to a user, an indicator that allows the position of the sensor section in the information communication apparatus to be specified, thereby easily realizing optimum position alignment of information communication apparatuses between the sensor position of the user's apparatus and the sensor position of a target apparatus when the user performs mutual communication.

In the first aspect, the indicator that allows the position of the sensor section to be specified may be a sign or a graphic displayed at the position of the sensor section, or may be two or more lines having an origin at the position of the sensor section. In the case of employing the two or more lines, they may be discriminated by at least one of color, thickness, and type, or may be vector lines.

By such a display manner, a user can more easily realize optimum position alignment of information communication apparatuses between the sensor position of the user's apparatus and the sensor position of a target apparatus.

Particularly, if the sensor section is an acceleration sensor, the apparatus information storing section may further store information about the reference axis direction of the acceleration sensor, and the control section may generate an indicator that allows the reference axis direction of the acceleration sensor to be specified, and may display the indicator on the display section, together with the indicator that allows the position of the sensor section to be specified.

By such a configuration, a user can easily overlap the sensor position of the user's apparatus and the sensor position of a target apparatus with increased accuracy.

The second aspect of the present invention is an information communication apparatus having a display section, the information communication apparatus including: a sensor section used for communication between the information communication apparatus and a target apparatus; an apparatus information storing section configured to store information about the position of the sensor section in the information communication apparatus and information about the position and the size of the display section in the information communication apparatus; a communication section configured to communicate with the target apparatus via a network and acquire information about the position of a sensor section in the target apparatus and information about the position and the size of a display section in the target apparatus; and a control section configured to calculate the relative positional relationship of the sensor sections and the display sections between the information communication apparatus and the target apparatus, based on the information about the information communication apparatus stored in the apparatus information storing section and the information about the target apparatus acquired by the communication section, generate an indicator for providing guidance for overlapping the sensor section of the information communication apparatus and the sensor section of the target apparatus, and display the indicator on the display section of the information communication apparatus, wherein the communication section transmits the indicator for providing guidance for overlapping, to the target apparatus.

According to the second aspect, it becomes possible to display an indicator that allows the position where two apparatuses are to be overlapped to be specified, on each of the screens of the display sections of the two apparatuses, whereby a user can easily overlap the sensor position of the user's apparatus and the sensor position of a target apparatus with increased accuracy.

In the second aspect, the indicator for providing guidance for overlapping may be two or more lines having an origin at a given position, and the two or more lines may be discriminated by at least one of color, thickness, and type, or may be vector lines.

By such a display manner, a user can more easily realize optimum position alignment of information communication apparatuses between the sensor position of the user's apparatus and the sensor position of a target apparatus.

Particularly, if the sensor section is an acceleration sensor, the apparatus information storing section may further store information about the reference axis direction of the acceleration sensor, and the control section may generate an indicator for providing guidance for overlapping such that the reference axis directions of the acceleration sensors of the information communication apparatus and the target apparatus coincide with each other, and may display the indicator on the display section.

By such a configuration, a user can easily overlap the sensor position of the user's apparatus and the sensor position of a target apparatus with increased accuracy.

The third aspect of the present invention is an indicator display method performed by an information communication apparatus having a sensor section used for communication with another apparatus, and a display section, or a program for executing the indicator display method by the information communication apparatus, the indicator display method including the steps of: acquiring information about the position of the sensor section in the information communication apparatus and information about the position and the size of the display section in the information communication apparatus, from a storage section of the information communication apparatus; calculating the relative positional relationship of the sensor section and the display section, based on the acquired information; generating an indicator that allows the position of the sensor section to be specified, based on the calculated relative positional relationship; and displaying the generated indicator on the display section.

According to the third aspect, it becomes possible to present, to a user, an indicator that allows the position of the sensor section in the information communication apparatus to be specified, thereby easily realizing optimum position alignment of information communication apparatuses between the sensor position of the user's apparatus and the sensor position of a target apparatus when the user performs mutual communication.

The fourth aspect of the present invention is an indicator display method performed by an information communication apparatus having a sensor section used for communication with a target apparatus, and a display section, or a program for executing the indicator display method by the information communication apparatus, the indicator display method including the steps of: acquiring information about the position of the sensor section in the information communication apparatus and information about the position and the size of the display section in the information communication apparatus, from a storage section of the information communication apparatus; communicating with the target apparatus via a network and acquiring information about the position of a sensor section in the target apparatus and information about the position and the size of a display section in the target apparatus; calculating the relative positional relationship of the sensor sections and the display sections between the information communication apparatus and the target apparatus, based on the acquired information about the information communication apparatus and the acquired information about the target apparatus; generating an indicator for providing guidance for overlapping the sensor section of the information communication apparatus and the sensor section of the target apparatus, based on the calculated relative positional relationship; displaying the generated indicator on the display section of the information communication apparatus; and transmitting the indicator for providing guidance for overlapping, to the target apparatus.

According to the fourth aspect, it becomes possible to display an indicator that allows the position where two apparatuses are to be overlapped to be specified, on each of the screens of the display sections of the two apparatuses, whereby a user can easily overlap the sensor position of the user's apparatus and the sensor position of a target apparatus with increased accuracy.

DETAILED DESCRIPTION OF EMBODIMENTS OF THE INVENTION

First Embodiment

FIG. 1 is a diagram showing the configuration of an information communication apparatus 1 according to the first embodiment of the present invention. In FIG. 1, the information communication apparatus 1 of the present embodiment includes a communication section 12, a display section 13, a sensor section 14, an apparatus information storing section 15, and a control section 16. The control section 16 includes an acquisition section 161, a generation section 162, and an output section 163.

Figure 2:
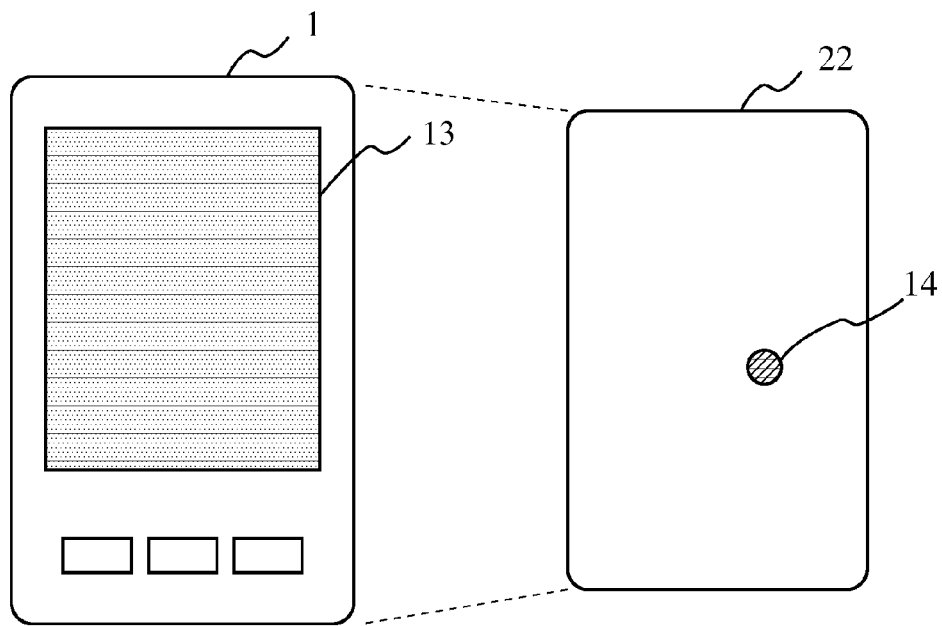
FIG. 2 is a diagram showing an example of an external appearance of the information communication apparatus 1.
Figure 3:
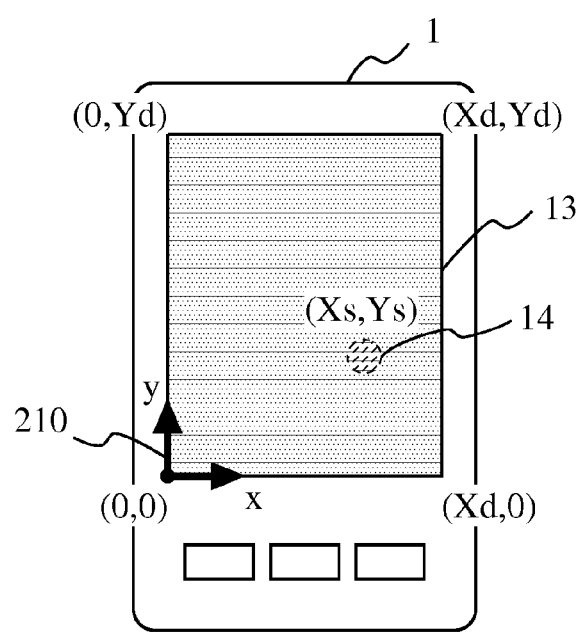
FIG. 3 is a diagram showing an example of the external appearance of the information communication apparatus 1.

FIG. 2 and FIG. 3 are diagrams showing an example of the external appearance of the information communication apparatus 1 according to the first embodiment of the present invention. As shown in FIG. 2, the information communication apparatus 1 of the present embodiment has the display section 13 provided on the surface of the housing thereof, and has the sensor section 14 provided on a substrate 22 inside the housing. In addition, arrows in FIG. 3 indicate a coordinate system 210 as a reference for representing the four corners of the display screen of the display section 13.

First, the summary of the components of the information communication apparatus 1 will be described.

The communication section 12 is a module for transmission and reception of information with another apparatus including another information communication apparatus via a network. The display section 13 is a component for displaying various kinds of information on the screen to a user, and is, for example, a thin display such as an LCD (Liquid Crystal Display). The display section 13 of the present embodiment has a screen of substantially rectangular shape as shown in FIG. 2. The display section 13 displays an indicator (described later) outputted from the control section 16 on the screen. The sensor section 14 is a sensor used for communication between information communication apparatuses. In the present embodiment, the type of the sensor is not specifically limited, but for example, a sensor used for short-range wireless communication such as NFC or an acceleration sensor used upon pairing may be applied.

The apparatus information storing section 15 stores information about a sensor section position 151 and a display section position 152. The sensor section position 151 is information indicating the position where the sensor section 14 is provided in the information communication apparatus 1. The display section position 152 is information indicating the position where the display section 13 is provided in the information communication apparatus 1, specifically, the positions of the four corners of the display screen. The sensor section position 151 and the display section position 152 may be any types of information as long as their relative positional relationship is obtained. In the present embodiment, as shown in FIG. 3, a coordinate value in a coordinate system with its origin being one corner (lower left in FIG. 3) of the display section 13 is used as such information, and the apparatus information storing section 15 stores coordinates (Xs, Ys) as the sensor section position 151, and coordinates (0, 0), (Xd, 0), (0, Yd), and (Xd, Yd) of the four corners of the display screen as the display section position 152.

It is noted that the sensor section position 151 and the display section position 152 may be stored in advance in a memory such as a ROM (Read Only Memory) before shipping of products of the information communication apparatus 1, or may be downloaded from a predetermined information server or the like via the communication section 12 after shipping of products of the information communication apparatus 1.

In the control section 16, the acquisition section 161 acquires information of the sensor section position 151 and the display section position 152 from the apparatus information storing section 15. Based on the information acquired by the acquisition section 161, the generation section 162 generates an indicator to be displayed on the screen of the display section 13 for specifying the position of the sensor section 14. The output section 163 outputs an indicator generated by the generation section 162 to the display section 13.

Figure 4:
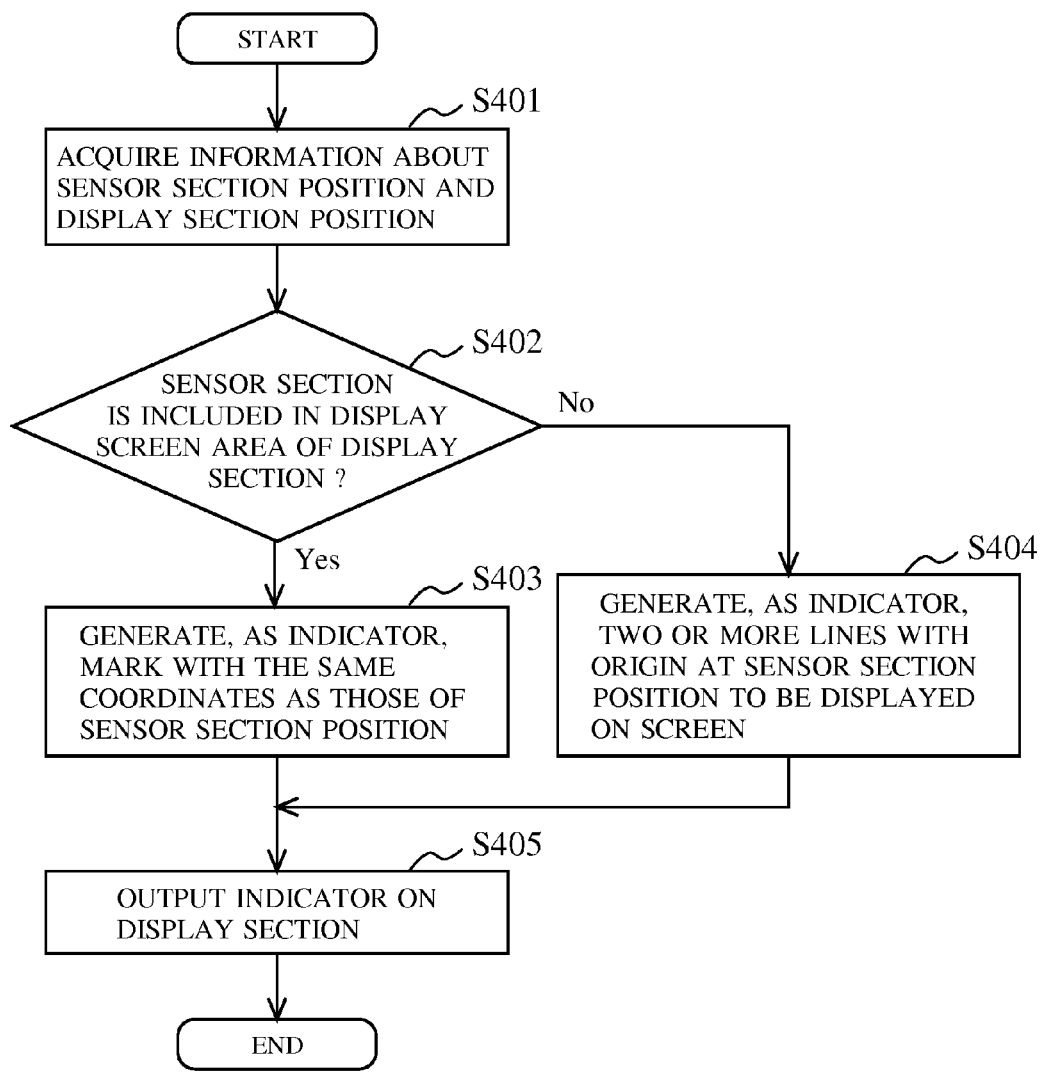
FIG. 4 is a flowchart showing a process of an indicator display method performed by the information communication apparatus 1.

Next, with reference to FIG. 4, a method for generating an indicator and displaying the indicator on the screen, performed by the information communication apparatus 1, will be described. FIG. 4 is a flowchart showing a process of the indicator display method performed by the information communication apparatus 1 according to the first embodiment of the present invention.

First, the acquisition section 161 acquires the sensor section position 151 and the display section position 152 from the apparatus information storing section 15 (step S401). Next, based on the position information acquired by the acquisition section 161, the generation section 162 determines whether or not the sensor section 14 is included within the display screen of the display section 13 (step S402). Specifically, the generation section 162 determines whether or not the coordinates (Xs, Ys) indicating the position of the sensor section 14 is included in an area surrounded by the coordinates (0, 0), (Xd, 0), (0, Yd), and (Xd, Yd) indicating the four corners of the display screen of the display section 13, by using the following expressions [1] and [2].

$$0 \leq Xs \leq Xd \quad [1]$$

$$0 \leq Ys \leq Yd \quad [2]$$

It is noted that actually, the sensor section 14 and the display screen of the display section 13 also have coordinate values in a depth (Z-axis) direction. However, in the present embodiment, "whether or not the sensor section 14 is included in the display screen area of the display section 13" is determined by the relationship with the position obtained by vertically projecting the position where the sensor section 14 is provided on two-dimensional plane (X-Y plane) as the display screen of the display section 13.

As a result of the determination in step S402, if the coordinates of the sensor section 14 are included in the display screen area of the display section 13, the generation section 162 generates an indicator 60 which is a mark for specifying the sensor section 14, at the position of the same coordinates (Xs, Ys) as those of the sensor section position 151 (step S403). A sign, a graphic, or the like may be used as the indicator 60. At this time, the generation section 162 may generate only an image of the indicator 60 that can be superimposed onto the screen, or may generate an image of the entire display screen of the display section 13 in which the indicator 60 is drawn.

On the other hand, as a result of the determination in step S402, if the coordinates of the sensor section 14 are not included in the display screen area of the display section 13, the generation section 162 generates, as an indicator 61, two or more lines having an origin being the position of the same coordinates (Xs, Ys) as those of the sensor section position 151, at least part of the line being displayed on the display screen of the display section 13 (step S404). It is preferable that the lines representing the indicator 61 are vector lines. At this time, the generation section 162 may generate only an image of the indicator 61 that can be superimposed onto the screen, or may generate an image of the entire display screen of the display section 13 in which the indicator 61 is drawn.

Then, the output section 163 outputs the indicator 60 or the indicator 61 generated by the generation section 162 to the display section 13 so as to be displayed on the screen (step S405).

Figure 5A:
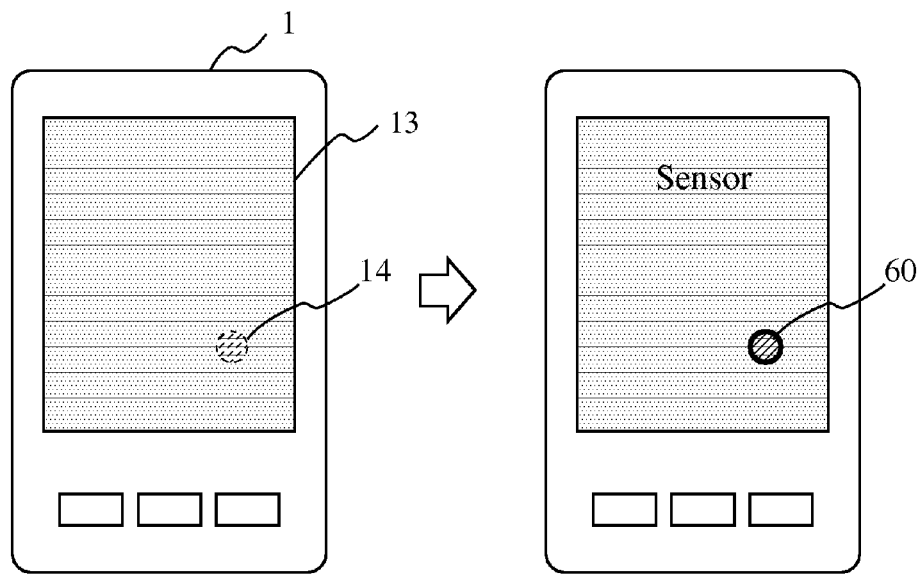
FIG. 5A is a diagram showing an example of a screen display of an indicator 60 on a display section 13.

FIG. 5A is a diagram showing an example of screen display of the indicator 60 on the display section 13 in the case where the coordinates of the sensor section 14 are included in the screen display area of the display section 13. As shown in FIG. 5A, in the case where the sensor section 14 is in the screen display area, the indicator 60 directly indicating the position of the sensor section 14 is displayed on the display section 13.

Figure 5B:
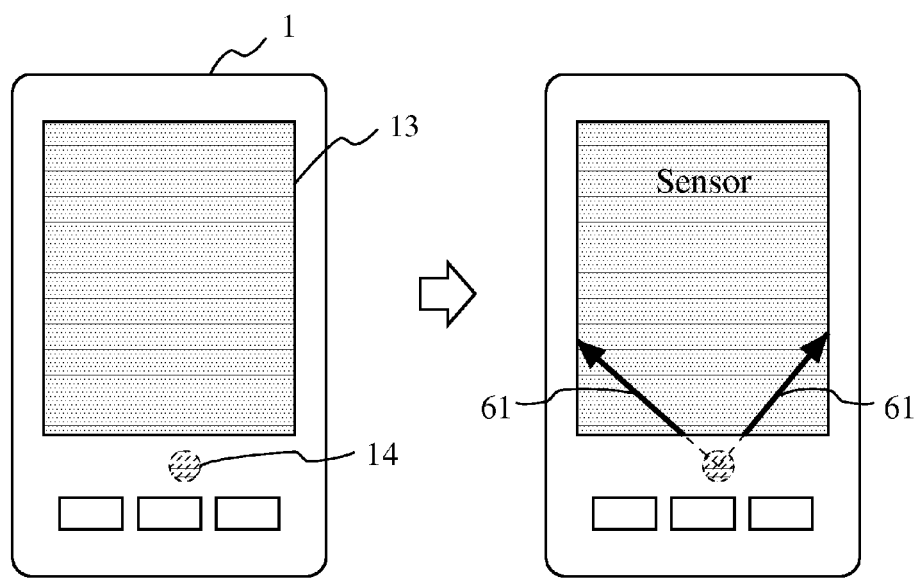
FIG. 5B is a diagram showing an example of a screen display of an indicator 61 on the display section 13.

In addition, FIG. 5B is a diagram showing an example of screen display of the indicator 61 on the display section 13 in the case where the coordinates of the sensor section 14 are not included in the screen display area of the display section 13. As shown in FIG. 5B, in the case where the sensor section 14 is not in the screen display area, the indicator 61 indirectly indicating the position of the sensor section 14 is displayed on the display section 13.

As described above, the information communication apparatus 1 according to the first embodiment of the present invention, for performing mutual communication, displays the indicator 60 or 61 which is a mark allowing the position of the sensor section 14 to be directly or indirectly specified, on the screen of the display section 13. Thus, a user can easily overlap the sensor position of the user's apparatus and the sensor position of a target apparatus with a minimum displacement therebetween.

Figure 6A:
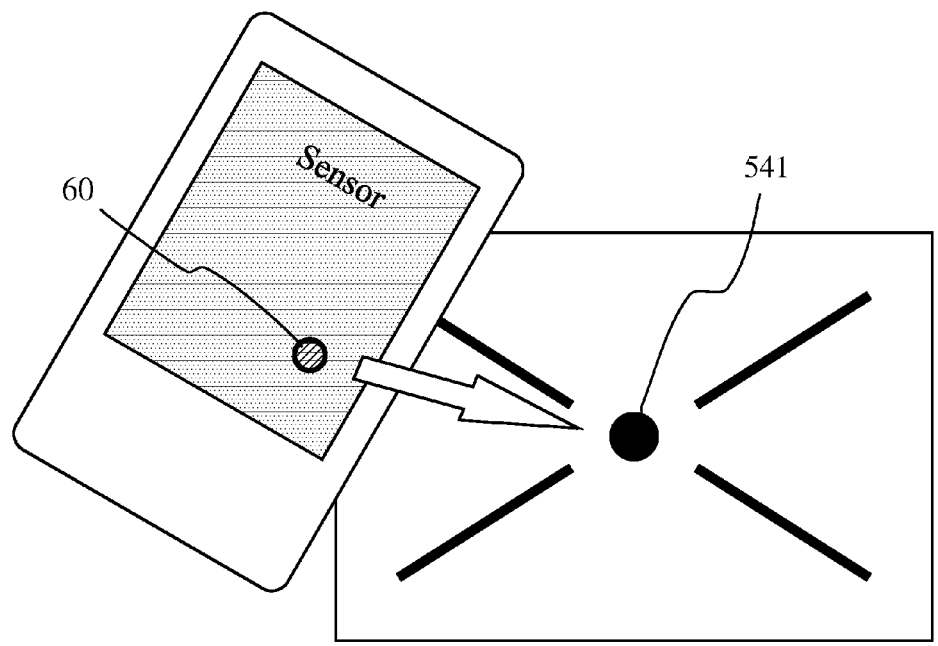
FIG. 6A is a diagram for explaining an overlapping operation of the apparatus and a target apparatus.
Figure 6B:
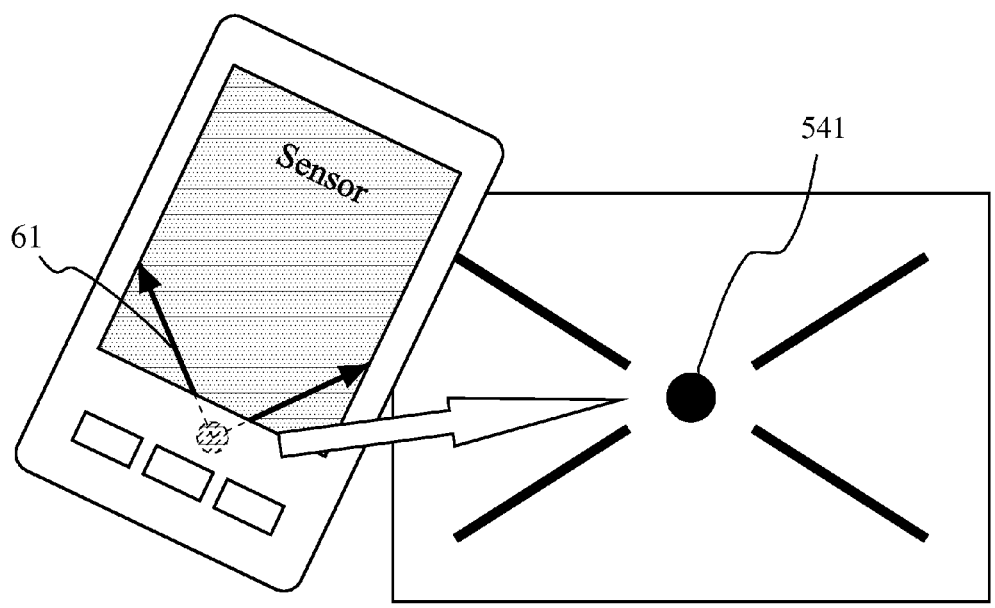
FIG. 6B is a diagram for explaining the overlapping operation of the apparatus and a target apparatus.

For example, as shown in FIG. 6A, when the position of the sensor section 14 is directly displayed, a user overlaps the user's apparatus onto a target apparatus such that the indicator 60 of the display section 13 approaches the position of a sensor section 541 of the target apparatus. In addition, as shown in FIG. 6B, when the position of the sensor section 14 is indirectly displayed, a user overlaps the user's apparatus onto a target apparatus such that the position of the sensor section 14 estimated from the indicator 61 of the display section 13 approaches the position of the sensor section 541 of the target apparatus.

Figure 6C:
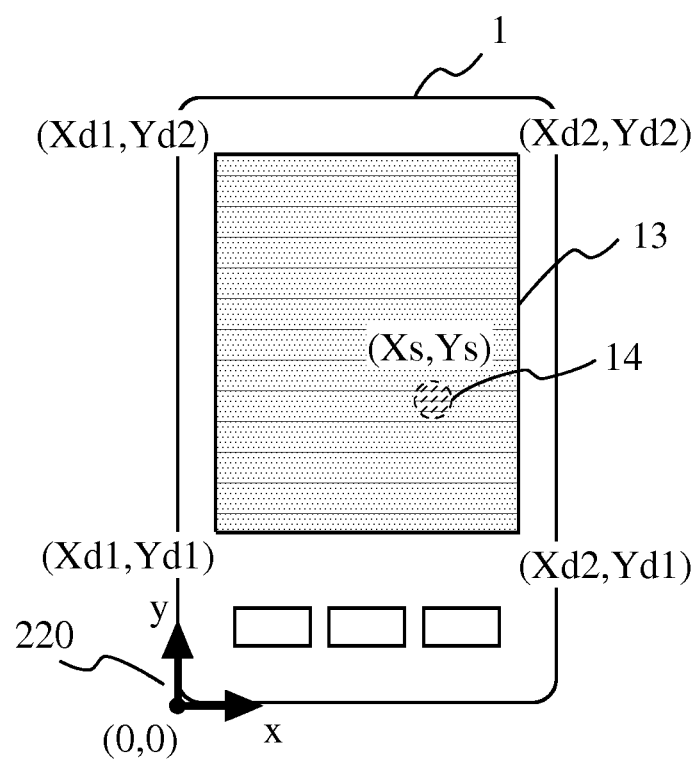
FIG. 6C is a diagram showing an example in which a coordinate system 220 is provided on a housing of the information communication apparatus 1.

In the above embodiment, as an example, the coordinate system 210 with its origin being one corner of the display screen of the display section 13 is used for specifying the position of the sensor section 14 (FIG. 3). Instead, a coordinate system 220 with its origin being one of the corners of the housing of the information communication apparatus 1 may be used (FIG. 6C). That is, a function and information for converting the display screen coordinate system of the display section 13 to a housing coordinate system of the information communication apparatus 1 may be provided. Thus, by allowing the position of the sensor section 14 to be also specified from the housing coordinate system of the information communication apparatus 1, even in the case where, for example, the same substrate 22 having the sensor section 14 is commonly used in various types of apparatuses having display sections different in their screen sizes, it becomes possible to easily specify the position of the sensor section 14.

Second Embodiment

Figure 7:
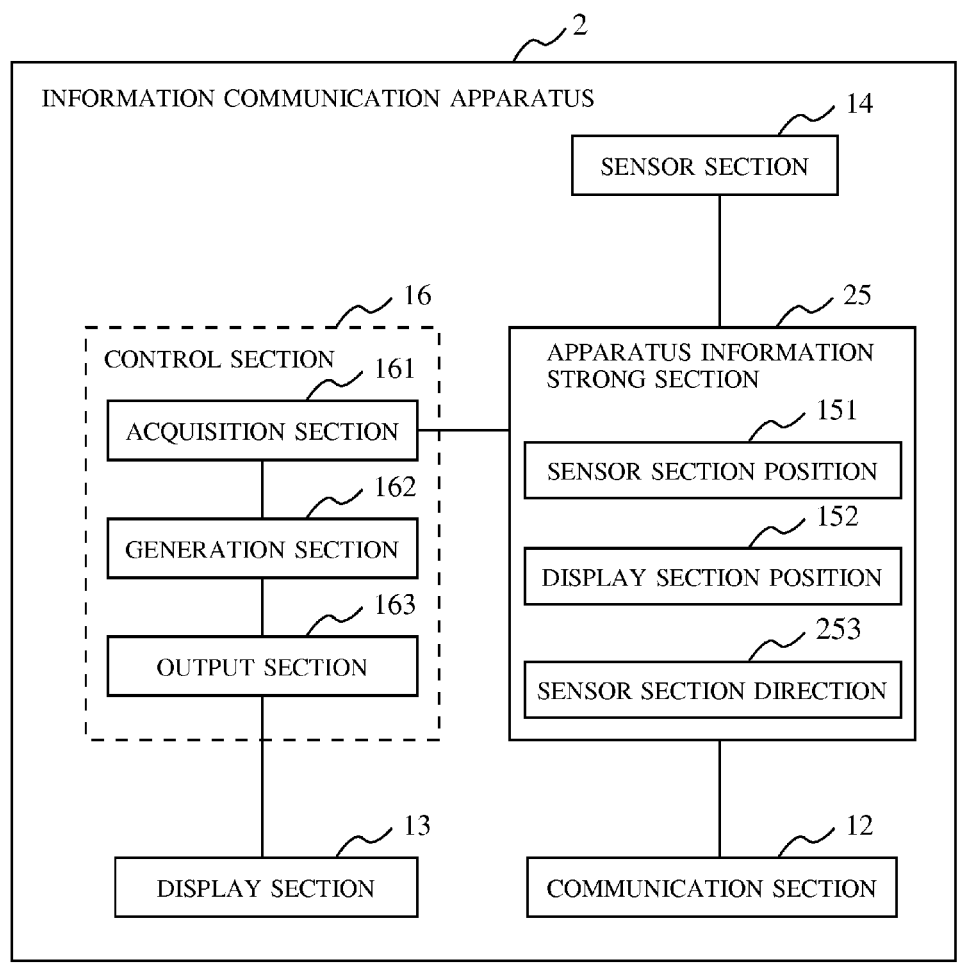
FIG. 7 is a diagram showing a configuration of an information communication apparatus 2 according to a second embodiment of the present invention.

FIG. 7 is a diagram showing the configuration of an information communication apparatus 2 according to the second embodiment of the present invention. In FIG. 7, the information communication apparatus 2 of the present embodiment includes the communication section 12, the display section 13, the sensor section 14, an apparatus information storing section 25, and the control section 16. The apparatus information storing section 25 stores information about the sensor section position 151, the display section position 152, and a sensor section direction 253.

As shown in FIG. 7, the information communication apparatus 2 of the present embodiment is different from the information communication apparatus 1 in that the apparatus information storing section 25 stores information about the sensor section direction 253. Hereinafter, the same components as those of the information communication apparatus 1 are denoted by the same reference numerals and the description thereof is omitted. The information communication apparatus 2 will be described focusing on the different configuration from that of the information communication apparatus 1.

The sensor section 14 is, in the present embodiment, an acceleration sensor. The apparatus information storing section 25 further stores the sensor section direction 253, in addition to the sensor section position 151 and the display section position 152 described above. The sensor section direction 253 is information about a reference axis direction of the sensor section 14 provided in the information communication apparatus 2.

Figure 8:
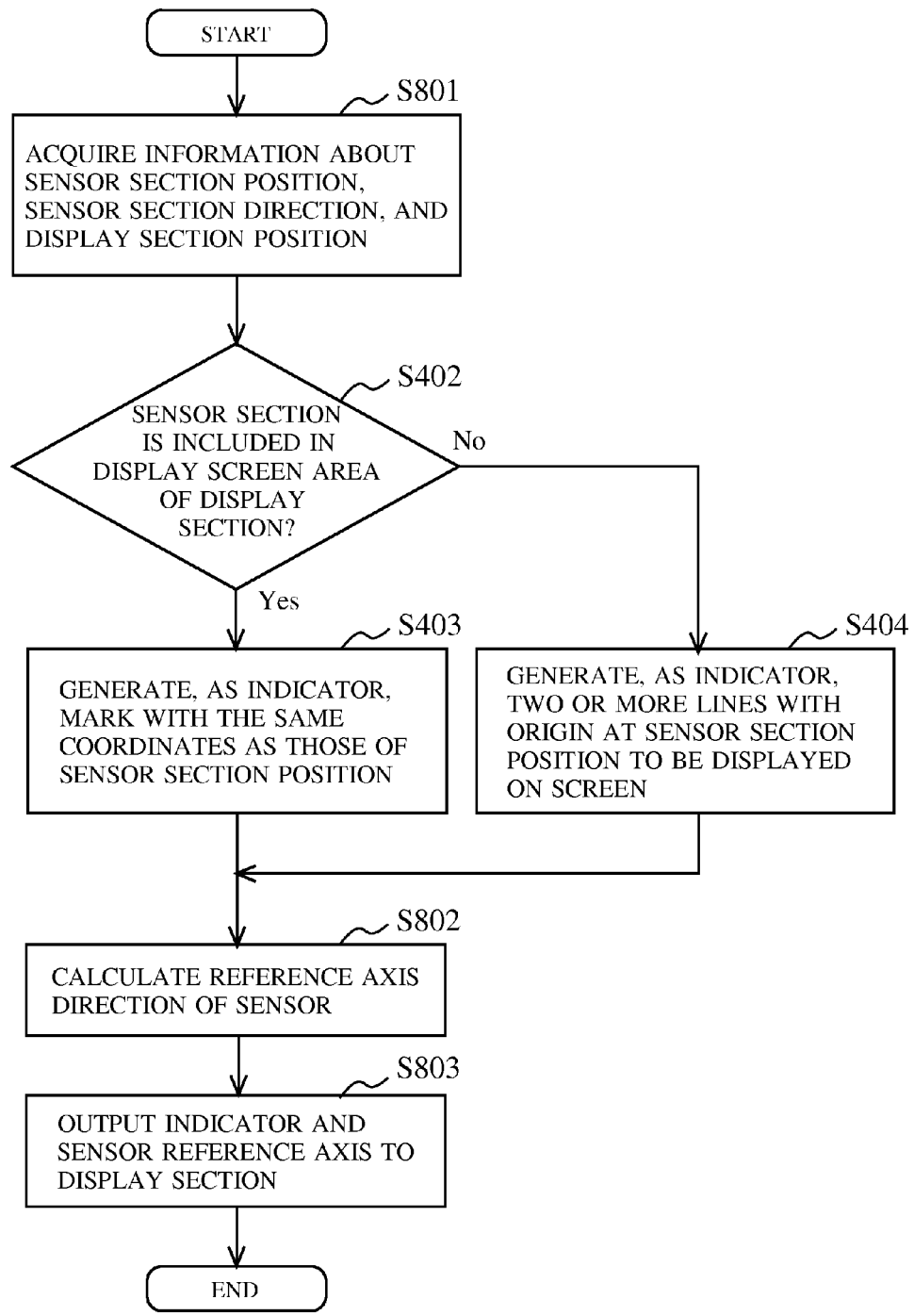
FIG. 8 is a flowchart showing a process of an indicator display method performed by the information communication apparatus 2.

With reference to FIG. 8, a method for generating an indicator and displaying the indicator on the screen, performed by the information communication apparatus 2, will be described. FIG. 8 is a flowchart showing a process of the indicator display method performed by the information communication apparatus 2 according to the second embodiment of the present invention.

First, the acquisition section 161 acquires the sensor section position 151, the sensor section direction 253, and the display section position 152 from the apparatus information storing section 25 (step S801). Next, based on the position information acquired by the acquisition section 161, the generation section 162 determines whether or not the sensor section 14 is included in the display screen area of the display section 13 (step S402), and generates the indicator 60 or the indicator 61 in accordance with the determination result (step S403 or S404). This processing is as described in the first embodiment.

In the second embodiment, the generation section 162 further calculates a reference axis direction of the sensor section 14 from the sensor section direction 253 (step S802). Then, in accordance with the calculated reference axis direction of the sensor section 14, the generation section 162 generates an image of a sensor coordinate system 230 to be drawn in the screen display area of the display section 13 (step S802).

Then, the output section 163 outputs the indicator 60 or the indicator 61, and the sensor coordinate system 230, which are generated by the generation section 162, to the display section 13 so as to be displayed on the screen (step S803).

Figure 9A:
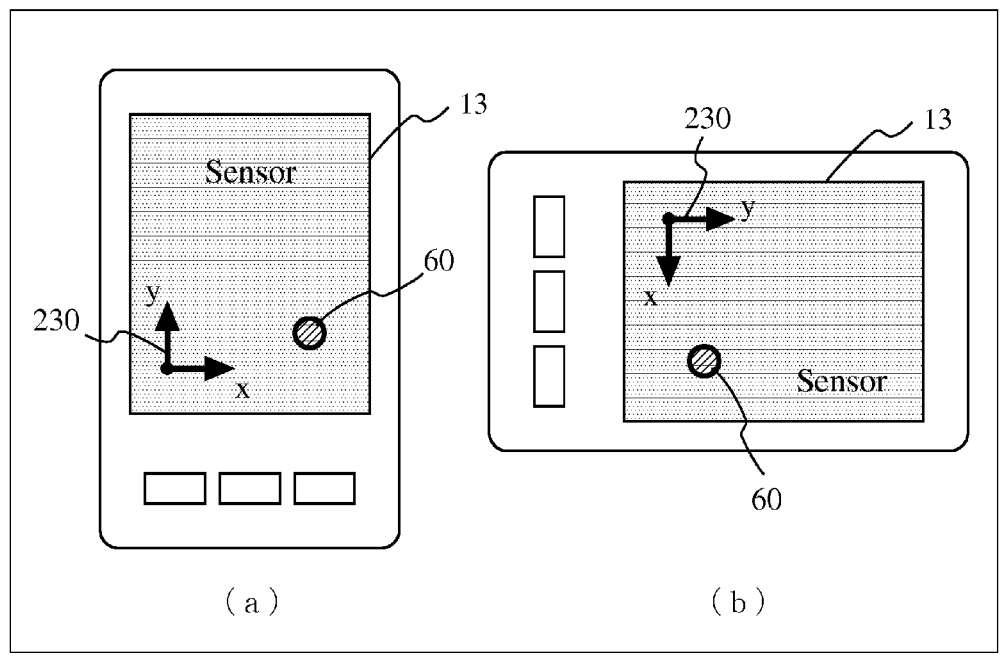
FIG. 9A is a diagram showing an example of a screen display of the indicator 60 and a sensor coordinate system 230 on the display section 13.
Figure 9B:
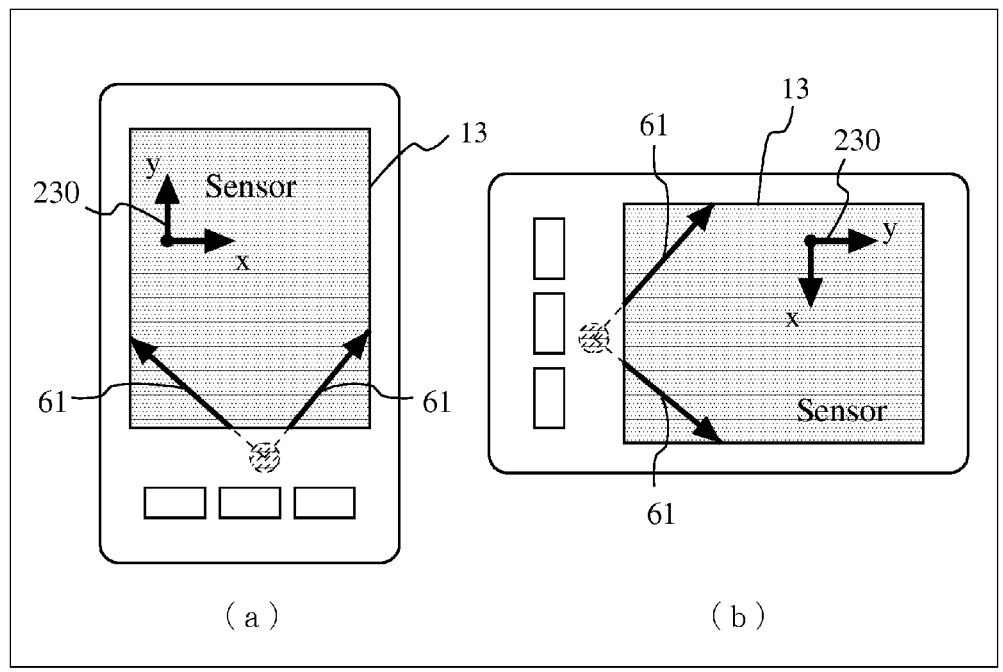
FIG. 9B is a diagram showing an example of a screen display of the indicator 61 and the sensor coordinate system 230 on the display section 13.

FIG. 9A is a diagram showing an example of screen display of the indicator 60 and the sensor coordinate system 230 on the display section 13 in the case where the coordinates of the sensor section 14 are included in the screen display area of the display section 13. FIG. 9B is a diagram showing an example of screen display of the indicator 61 and the sensor coordinate system 230 on the display section 13 in the case where the coordinates of the sensor section 14 are not included in the screen display area of the display section 13. It is noted that as shown in FIG. 9A and FIG. 9B, the display of the sensor coordinate system 230 changes in accordance with the direction of the screen of the display section 13, for example. In addition, although the position where an image of the sensor coordinate system 230 is displayed is not specifically limited, in the case where the indicator 60 allowing the position of the sensor section 14 to be directly specified is displayed on the screen of the display section 13, an image may be generated such that the positions of the indicator 60 and the origin of the sensor coordinate system 230 coincide with each other.

As described above, the information communication apparatus 2 according to the second embodiment of the present invention, for performing mutual communication, also displays the direction of the sensor section 14 on the display section 13, in addition to the indicator 60 or 61 allowing the position of the sensor section 14 to be specified. Thus, a user can easily overlap the sensor position of the user's apparatus and the sensor position of a target apparatus with increased accuracy.

Third Embodiment

In the first and second embodiments, the case where the indicator 60 or 61 is displayed on the screen of the apparatus based on only the position of the sensor section 14 of said apparatus, has been described.

In third embodiment, the case where, based on the positions of the two sensor sections of the apparatus and a target apparatus, an indicator is displayed on the screens of the display sections of both apparatuses, will be described.

Figure 10:
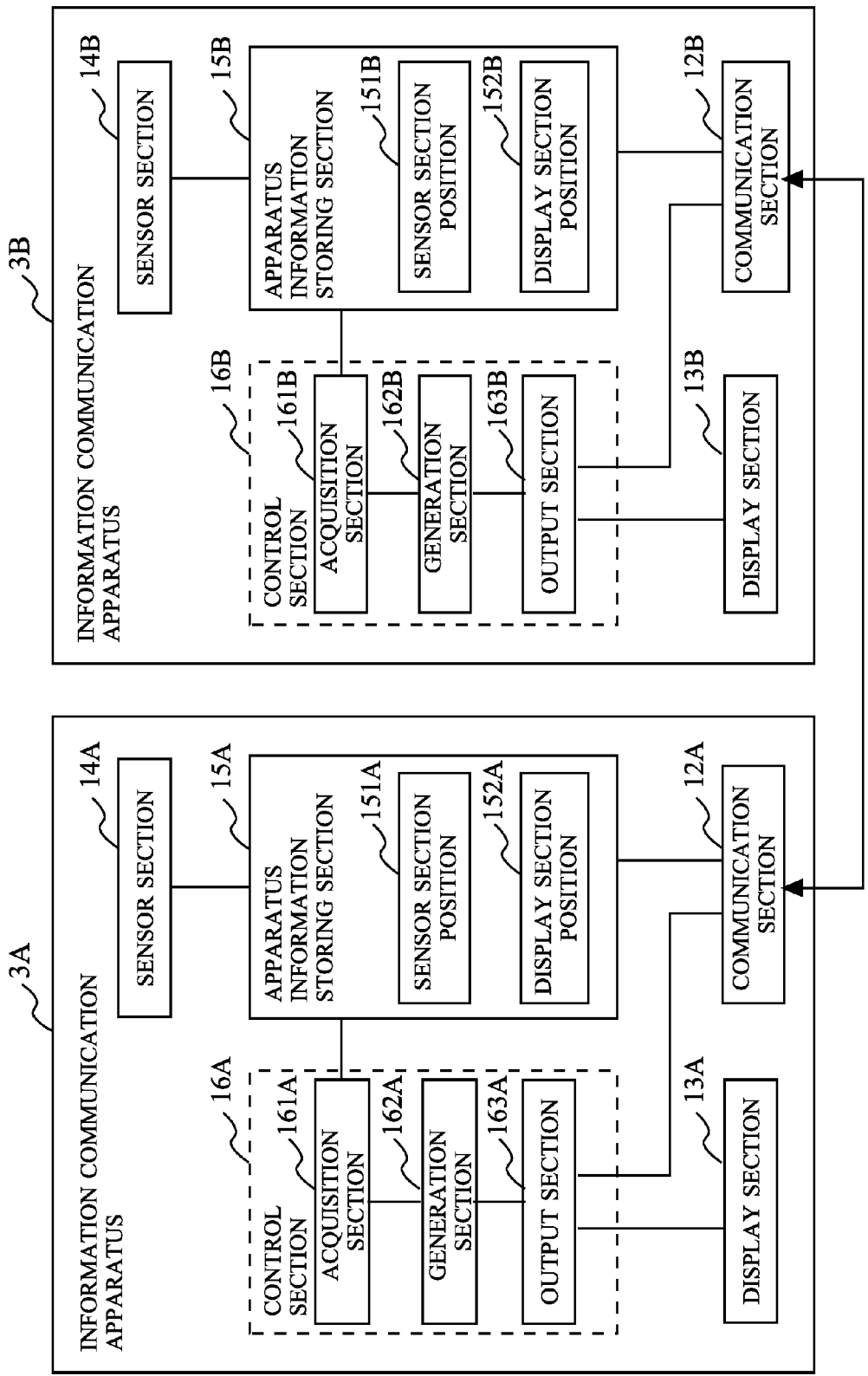
FIG. 10 is a diagram showing a system configuration including information communication apparatuses 3A and 3B according to a third embodiment of the present invention.

FIG. 10 is a diagram showing a system configuration including information communication apparatuses 3A and 3B according to the third embodiment of the present invention. The information communication apparatuses 3A and 3B included in the system belong to the same wireless network, and basically have the same configuration as that of the information communication apparatus 1 according to the first embodiment. However, processing in each component is somewhat different. Hereinafter, the components of the information communication apparatus 3A are denoted by the respective reference numerals followed by "A", and the components of the information communication apparatus 3B are denoted by the respective reference numerals followed by "B".

Figure 11:
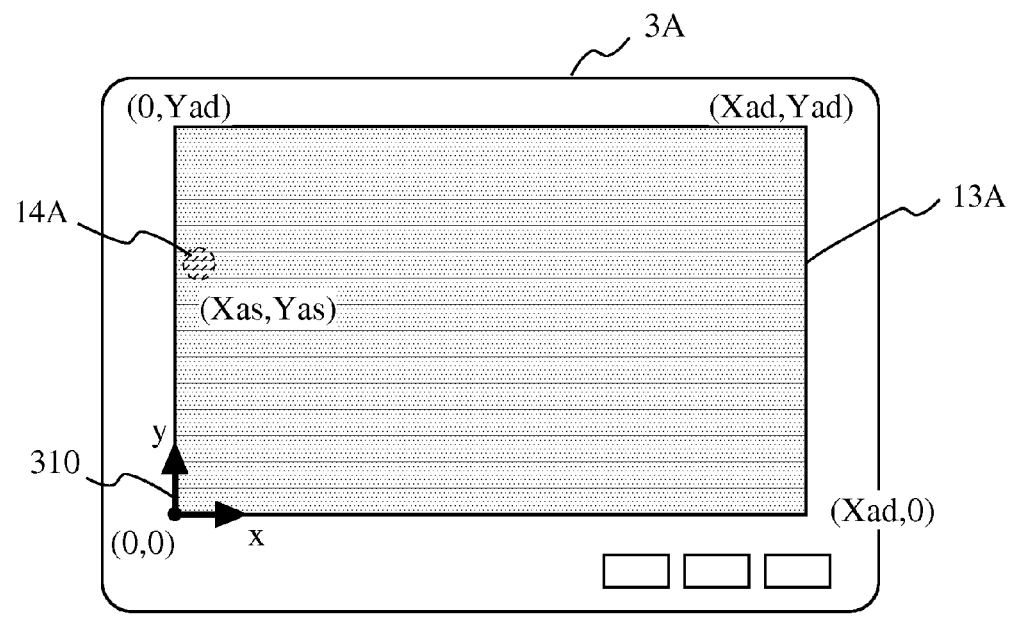
FIG. 11 is a diagram showing an example of an external appearance of the information communication apparatus 3A.
Figure 12:
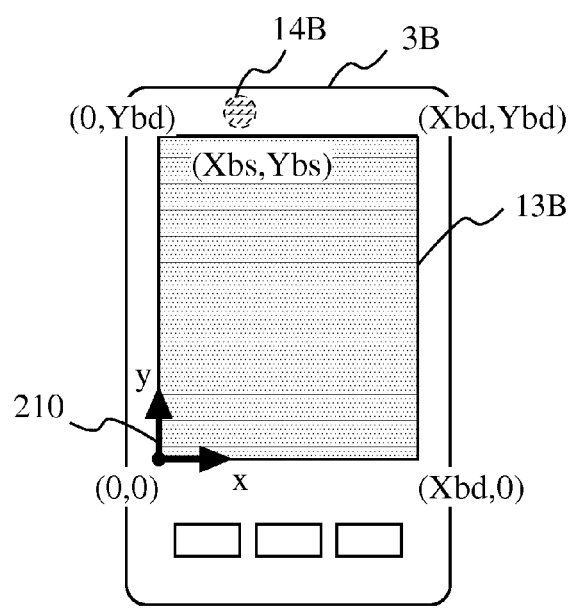
FIG. 12 is a diagram showing an example of an external appearance of the information communication apparatus 3B.

FIG. 11 and FIG. 12 are diagrams showing examples of the external appearances of the information communication apparatuses 3A and 3B according to the third embodiment of the present invention. The information communication apparatus 3A is an apparatus like a tablet PC having a sensor section 14A provided at the position of coordinates (Xas, Yas) in a coordinate system 310, and having a display section 13A as a display screen with its four corners being at coordinates (0, 0), (Xad, 0), (0, Yad), and (Xad, Yad) (FIG. 11). The information communication apparatus 3B is an apparatus like a smartphone having a sensor section 14B provided at the position of coordinates (Xbs, Ybs) in the coordinate system 210, and having a display section 13B as a display screen with its four corners being at coordinates (0, 0), (Xbd, 0), (0, Ybd), and (Xbd, Ybd) (FIG. 12). Under such assumption, the third embodiment will be described below.

Figure 13:
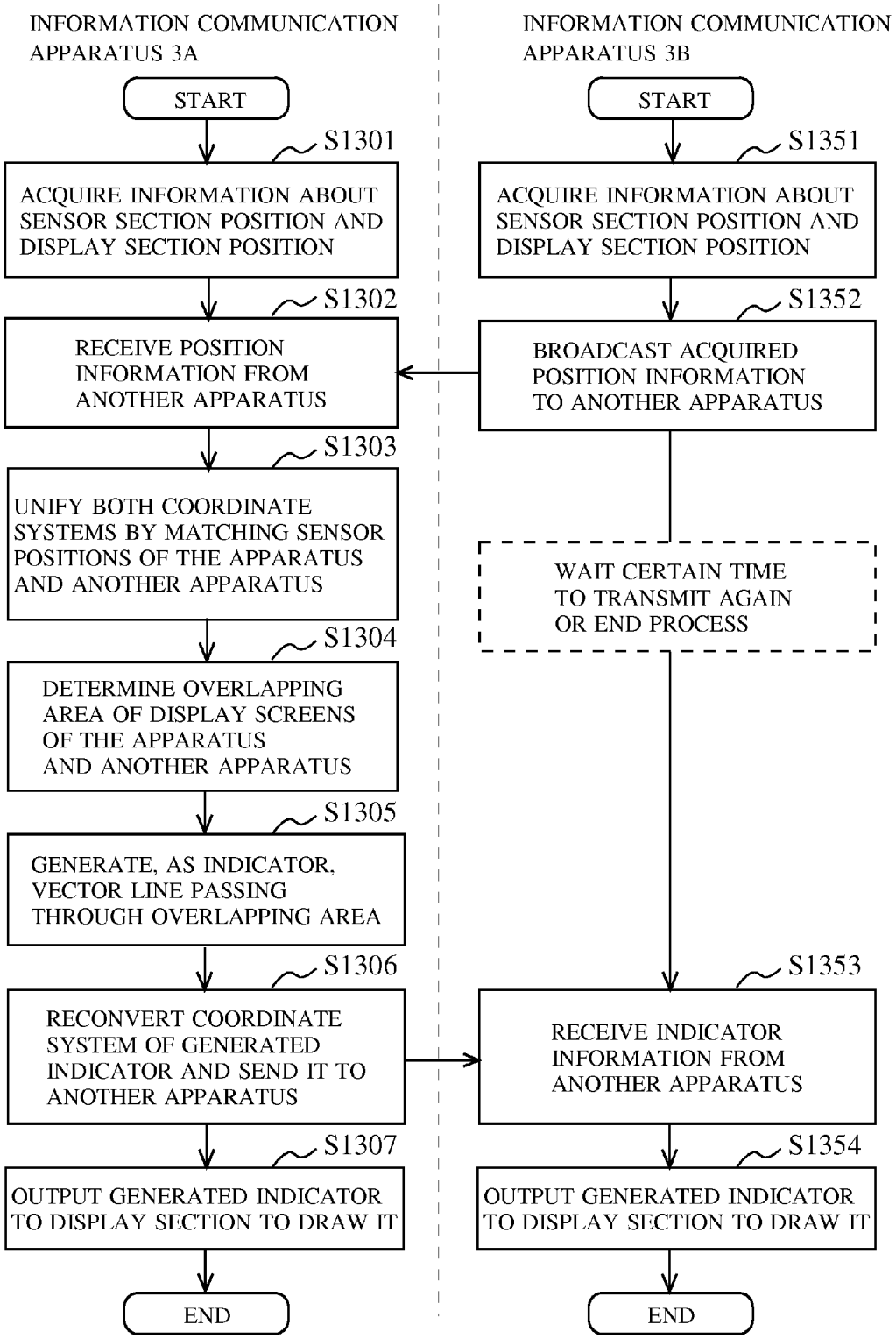
FIG. 13 is a flowchart showing a process of an indicator display method performed by the information communication apparatuses 3A and 3B.

With reference to FIG. 13, a method for generating an indicator and displaying the indicator on the screen, performed by the information communication apparatuses 3A and 3B, will be described. FIG. 13 is a flowchart showing a process of the indicator display method performed by the information communication apparatuses 3A and 3B according to the third embodiment of the present invention.

When the process is started, in the information communication apparatus 3A, an acquisition section 161A acquires a sensor section position 151A of the sensor section 14A and a display section position 152A of the display section 13A from an apparatus information storing section 15A (step S1301). In addition, in the information communication apparatus 3B, an acquisition section 161B acquires a sensor section position 151B of the sensor section 14B and a display section position 152B of the display section 13B from an apparatus information storing section 15B (step S1351).

Next, the information communication apparatus 3B transmits, by broadcast, the position information acquired by the acquisition section 161B to another apparatus including the information communication apparatus 3A connected to the network, via the communication section 12B (step S1352).

It is noted that after transmitting the position information by broadcast, if there is no response from another apparatus in a certain time period, the information communication apparatus 3B may transmit the position information again to another apparatus by broadcast, or may end the present processing.

The information communication apparatus 3A receives, via a communication section 12A, the position information transmitted from the information communication apparatus 3B by broadcast (step S1302). A generation section 162A of the information communication apparatus 3A generates an indicator as a mark for overlapping the information communication apparatus 3A and the information communication apparatus 3B such that the sensor section 14A approaches the sensor section 14B, based on the sensor section position 151A and the display section position 152A acquired by the acquisition section 161A, and on the sensor section position 151B and the display section position 152B received by the communication section 12A (steps S1303 to S1305). The indicator is generated as shown below.

The generation section 162A converts coordinates in the coordinate system 210 representing the position information of the information communication apparatus 3B when the position of the sensor section 14B is aligned with the position of the sensor section 14A, to coordinates in the coordinate system 310 representing the position information of the information communication apparatus 3A (step S1303). That is, the coordinate value differences when the position of the sensor section 14B is aligned with the position of the sensor section 14A of the information communication apparatus 3A are "Xas−Xbs" in the X-axis direction "Yas−Ybs" in the Y-axis direction. Therefore, the coordinates of the four corners of the display screen area of the display section 13B of the information communication apparatus 3B are respectively converted to coordinates (Xas−Xbs, Yas−Ybs), (Xbd+Xas−Xbs, Yas−Ybs), (Xas−Xbs, Ybd+Yas−Ybs), and (Xbd+Xas−Xbs, Ybd+Yas−Ybs).

Next, the generation section 162A obtains an area where the display section position 152A of the display section 13A and the display section position 152B of the display section 13B, which are both represented in the coordinate system 310, overlap with each other (step S1304). The overlapping area is determined by the magnitude relationship between the coordinates of the four corners of the display screen area of the display section 13A of the information communication apparatus 3A and the coordinates of the four corners of the display screen area of the display section 13B of the information communication apparatus 3B, as shown below.

Regarding the X-axis direction, the condition and the overlapping area are as follows.

$Xas-Xbs<0$ and $0 \leq Xbd+Xas-Xbs \leq Xad$ [3]

$Xas-Xbs<0$ and $Xad<Xbd+Xas-Xbs$ [4]

$0 \leq Xas-Xbs<Xad$ and $0<Xbd+Xas-Xbs \leq Xad$ [5]

$0<Xas-Xbs \leq Xad$ and $Xad<Xbd+Xas-Xbs$ [6]

The overlapping area in the X-axis direction is in a range "0 to Xbd+Xas−Xbs" if expression [3] is satisfied, in a range "0 to Xad" if expression [4] is satisfied, in a range "Xas−Xbs to Xbd+Xas−Xbs" if expression [5] is satisfied, and in a range "Xas−Xbs to Xad" if expression [6] is satisfied.

Similarly, regarding the Y-axis direction, the condition and the overlapping area are as follows.

$Yas-Ybs<0$ and $0 \leq Ybd+Yas-Ybs \leq Yad$ [7]

$Yas-Ybs<0$ and $Yad<Ybd+Yas-Ybs$ [8]

$0 \leq Yas-Ybs<Yad$ and $0<Ybd+Yas-Ybs \leq Yad$ [9]

$0<Yas-Ybs \leq Yad$ and $Yad<Ybd+Yas-Ybs$ [10]

The overlapping area in the Y-axis direction is in a range "0 to Ybd+Yas−Ybs" if expression [7] is satisfied, in a range "0 to Yad" if expression [8] is satisfied, in a range "Yas−Ybs to Ybd+Yas−Ybs" if expression [9] is satisfied, and in a range "Yas−Ybs to Yad" if expression [10] is satisfied.

Figure 14:
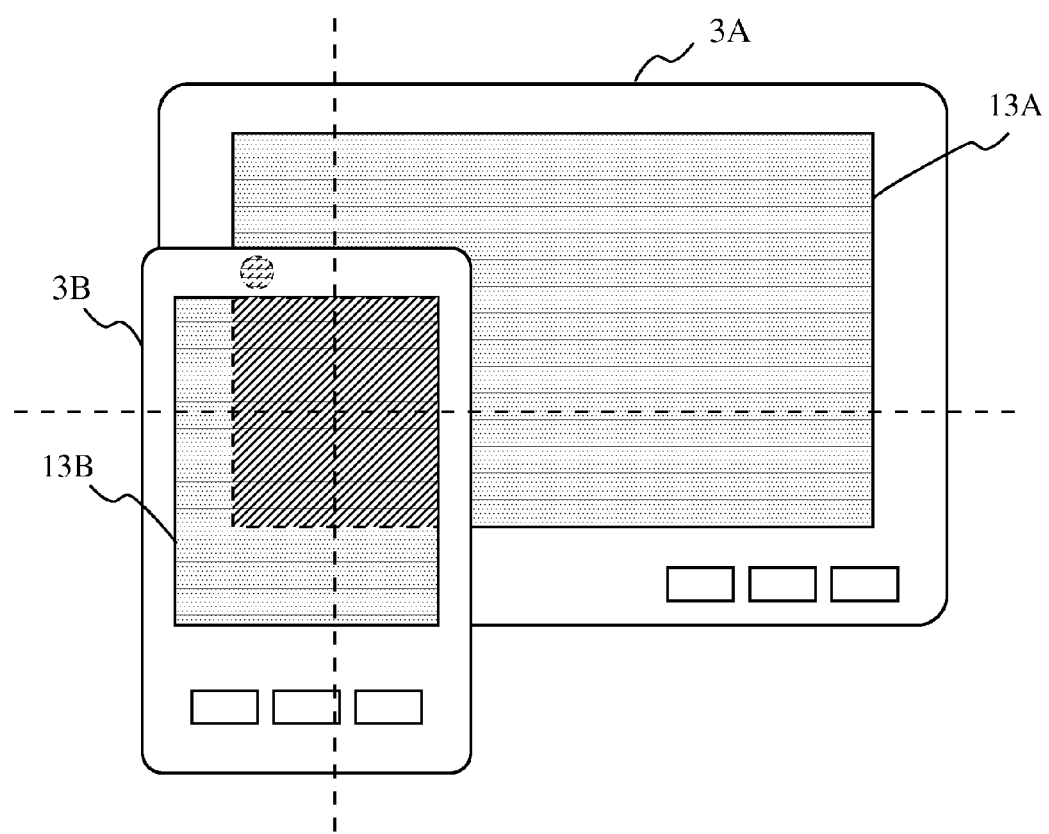
FIG. 14 is a diagram showing an example of an overlapping operation of the information communication apparatus 3A and the information communication apparatus 3B.

The case where the position of the sensor section 14A of the information communication apparatus 3A and the position of the sensor section 14B of the information communication apparatus 3B are aligned with each other in overlapping state exemplified in FIG. 14 corresponds to the condition expression [3] and the condition expression [7]. In this case, an area surrounded by coordinates (0, 0), (Xbd+Xas−Xbs, 0), (0, Ybd+Yas−Ybs), and (Xbd+Xas−Xbs, Ybd+Yas−Ybs) is the overlapping area (oblique-line-hatched area in FIG. 14).

Figure 15A:
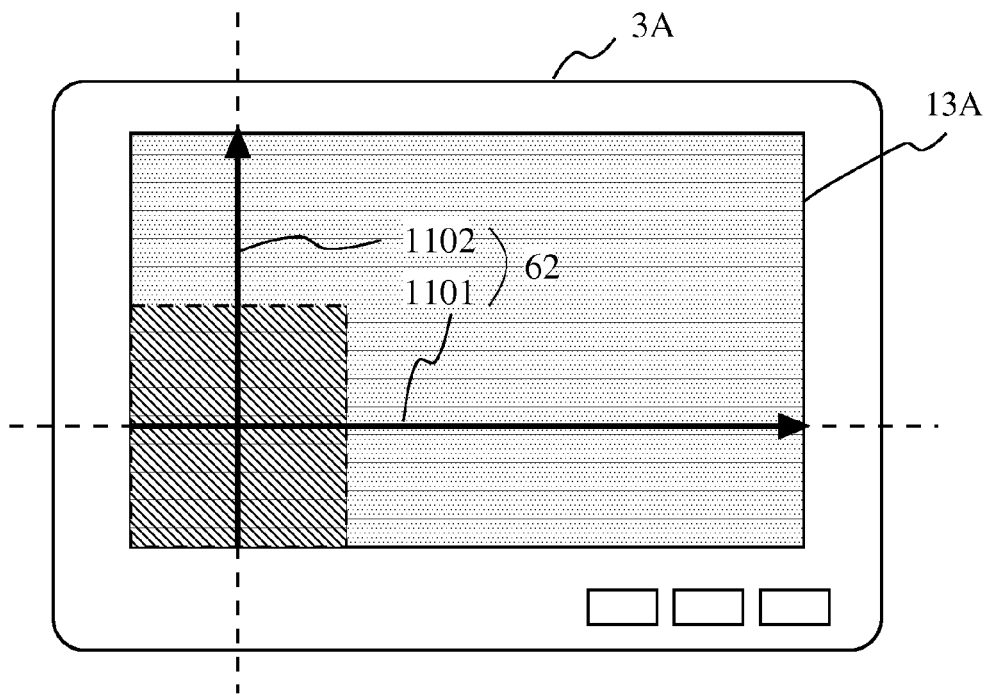
FIG. 15A shows an example of an indicator 62 displayed on a display section 13A.

Next, the generation section 162A sets two lines (dashed lines in FIG. 14) passing through the overlapping area. Then, the generation section 162A generates lines that align with the set two lines and are within the screen size of the display section 13A, e.g., vector lines 1101 and 1102 (see FIG. 15A), as an indicator 62 for the information communication apparatus 3A (step S1305). In the present embodiment, the vector lines 1101 and 1102 are respectively represented by expression (s, Yvl) and expression (Xvl, t), with s and t as parameters.

Figure 15B:
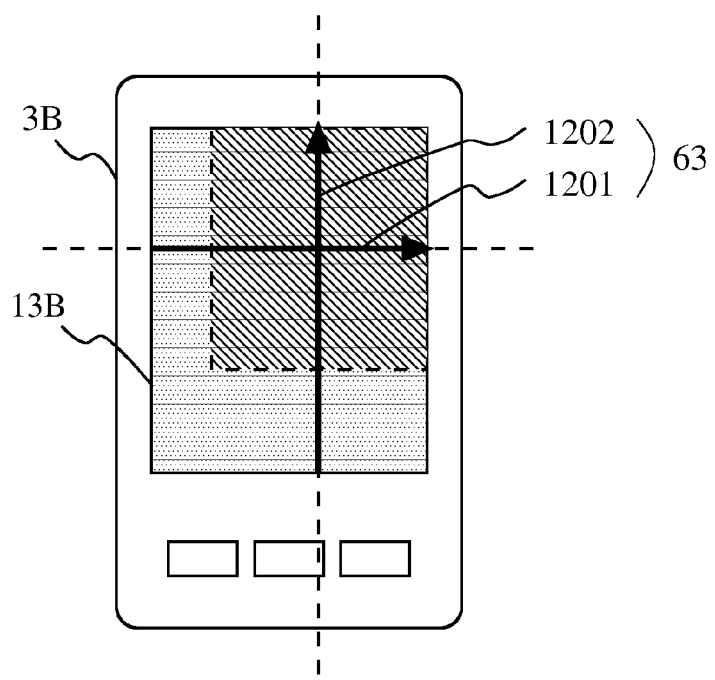
FIG. 15B shows an example of an indicator 63 displayed on a display section 13B.

Next, an output section 163A generates, as an indicator 63, vector lines obtained by reconverting the vector lines 1101 and 1102 generated by the generation section 162A to values in the coordinate system 210 of the information communication apparatus 3B, more specifically, vector lines 1201 and 1202 (see FIG. 15B) that are within the screen size of the display section 13B of the information communication apparatus 3B, and sends the generated vector lines to the information communication apparatus 3B via the communication section 12A (step S1306). In the present embodiment, the output section 163A sends information about vector lines represented by expression (s, Yvl−Yas+Ybs) and expression (Xvl−Xas+Xbs, t), to the information communication apparatus 3B.

Then, the output section 163A outputs, to the display section 13A, the indicator 62 (vector lines 1101 and 1102) generated by the generation section 162A, so as to be displayed on the screen (step S1307). Thus, the indicator 62 is displayed on the screen of the display section 13A (FIG. 16).

The information communication apparatus 3B receives the indicator information sent from the information communication apparatus 3A, via the communication section 12B (step S1353). Then, an output section 163B outputs, to the display section 13B, the indicator 63 (vector lines 1201 and 1202) given by the received indicator information, so as to be displayed on the screen (step S1354). Thus, the indicator 63 is displayed on the screen of the display section 13B (FIG. 16).

Figure 16:
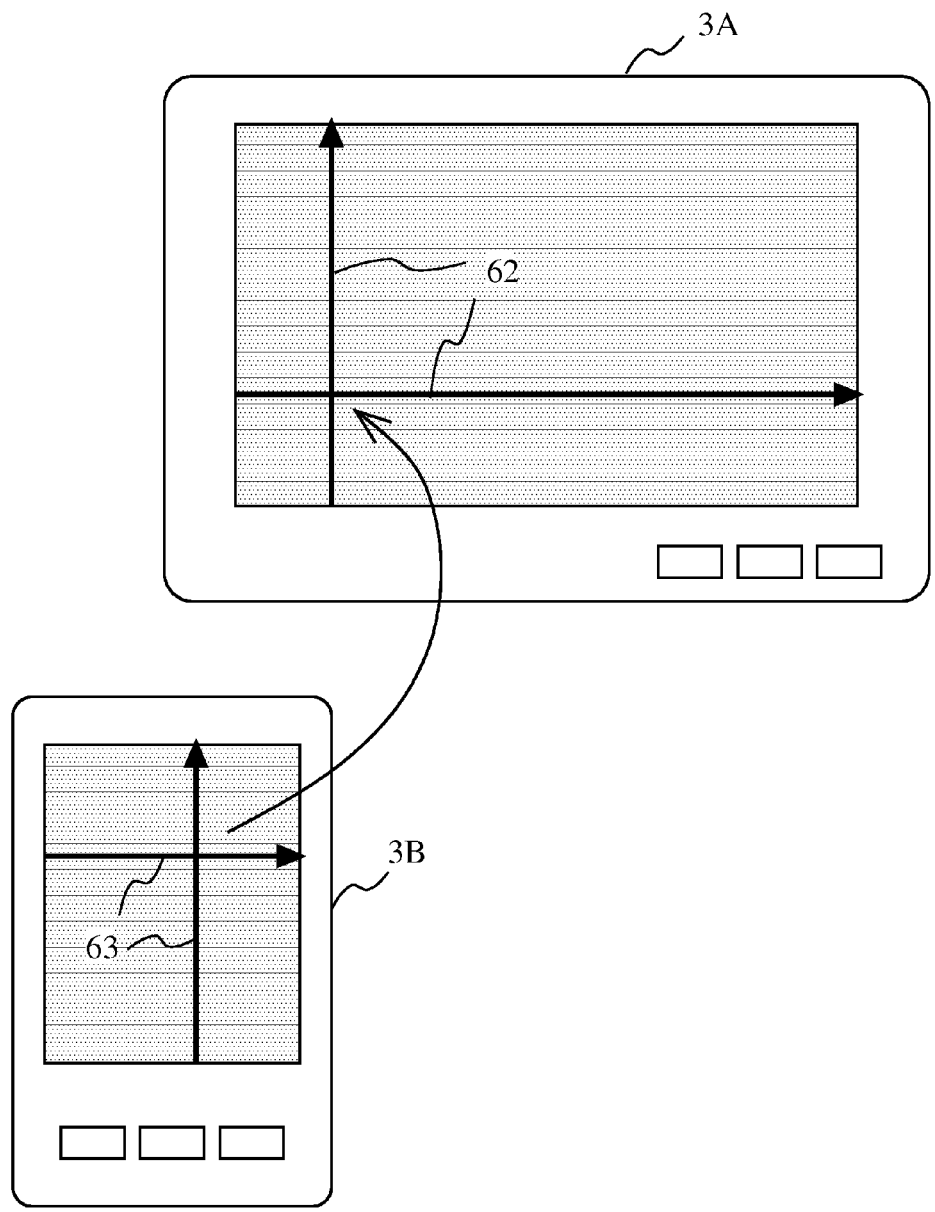
FIG. 16 is a diagram for explaining an overlapping operation of the indicator 62 and the indicator 63.
Figure 17A:
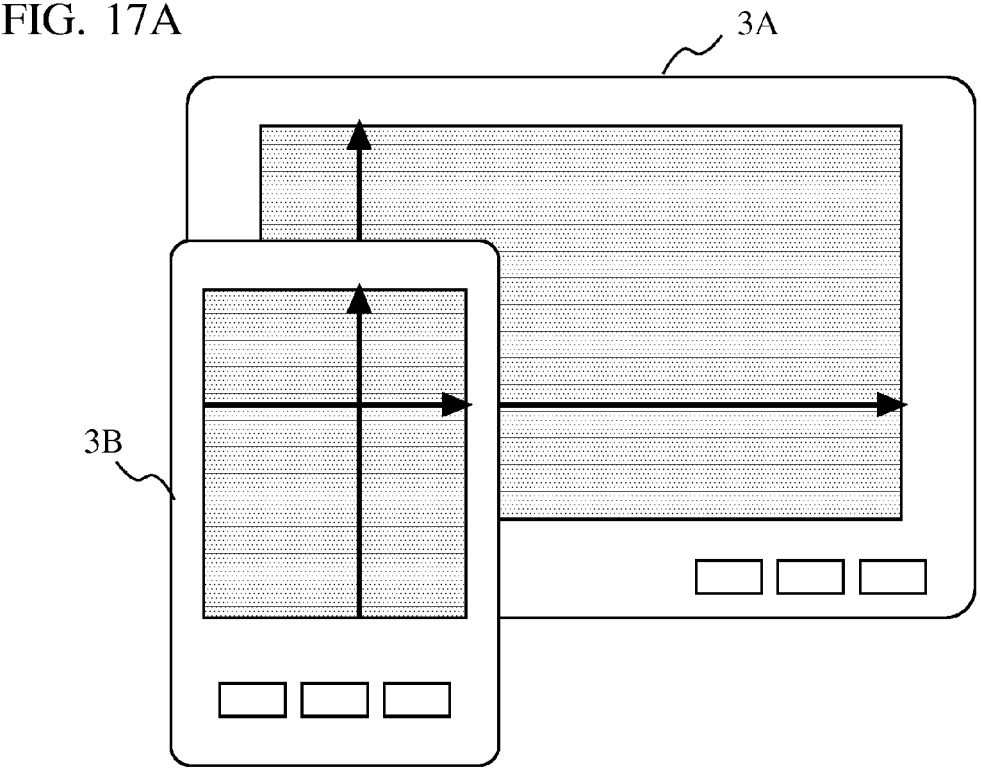
FIG. 17A is a diagram for explaining an overlapping operation of the indicator 62 and the indicator 63.

By overlapping the information communication apparatus 3A and the information communication apparatus 3B in accordance with the display of the indicator 62 and the indicator 63 so as to overlap the two indicators with each other, the positions of the sensor section 14A and the sensor section 14B can be easily aligned with each other (FIG. 16 and FIG. 17A).

As described above, the information communication apparatuses 3A and 3B according to the third embodiment of the present invention, for performing mutual communication, display the indicators 62 and 63 allowing the position where the two apparatuses are to be overlapped to be specified, on the screens of the display sections 13A and 13B, respectively. Thus, a user can easily overlap the sensor position of the user's apparatus and the sensor position of a target apparatus with increased accuracy.

Figure 17B:
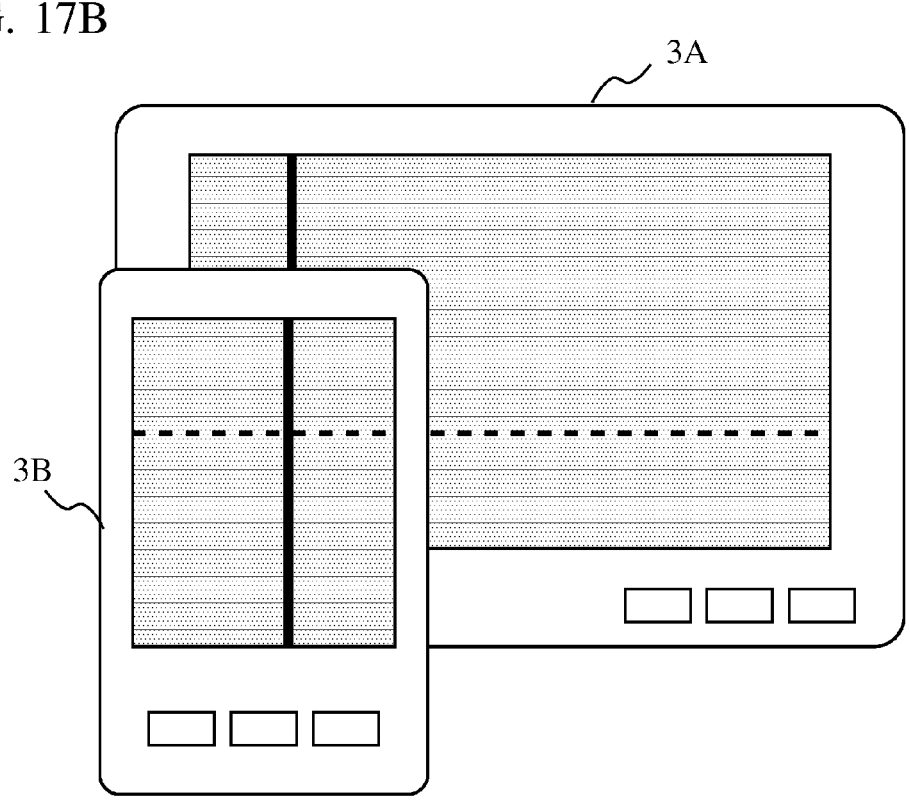
FIG. 17B is a diagram for explaining another overlapping operation of the indicator 62 and the indicator 63.

In the above embodiment, two orthogonal lines are set as the lines passing through the overlapping area, as an example. However, as long as an indicator that allows the information communication apparatus 3A and the information communication apparatus 3B to be overlapped can be generated, the two lines may not be orthogonal, or three or more lines or a curve may be set. In addition, if such two or more lines are discriminated by the color, type, or thickness of the lines, convenience for a user to overlap the information communication apparatus 3A and the information communication apparatus 3B is increased (FIG. 17B).

Figure 18:
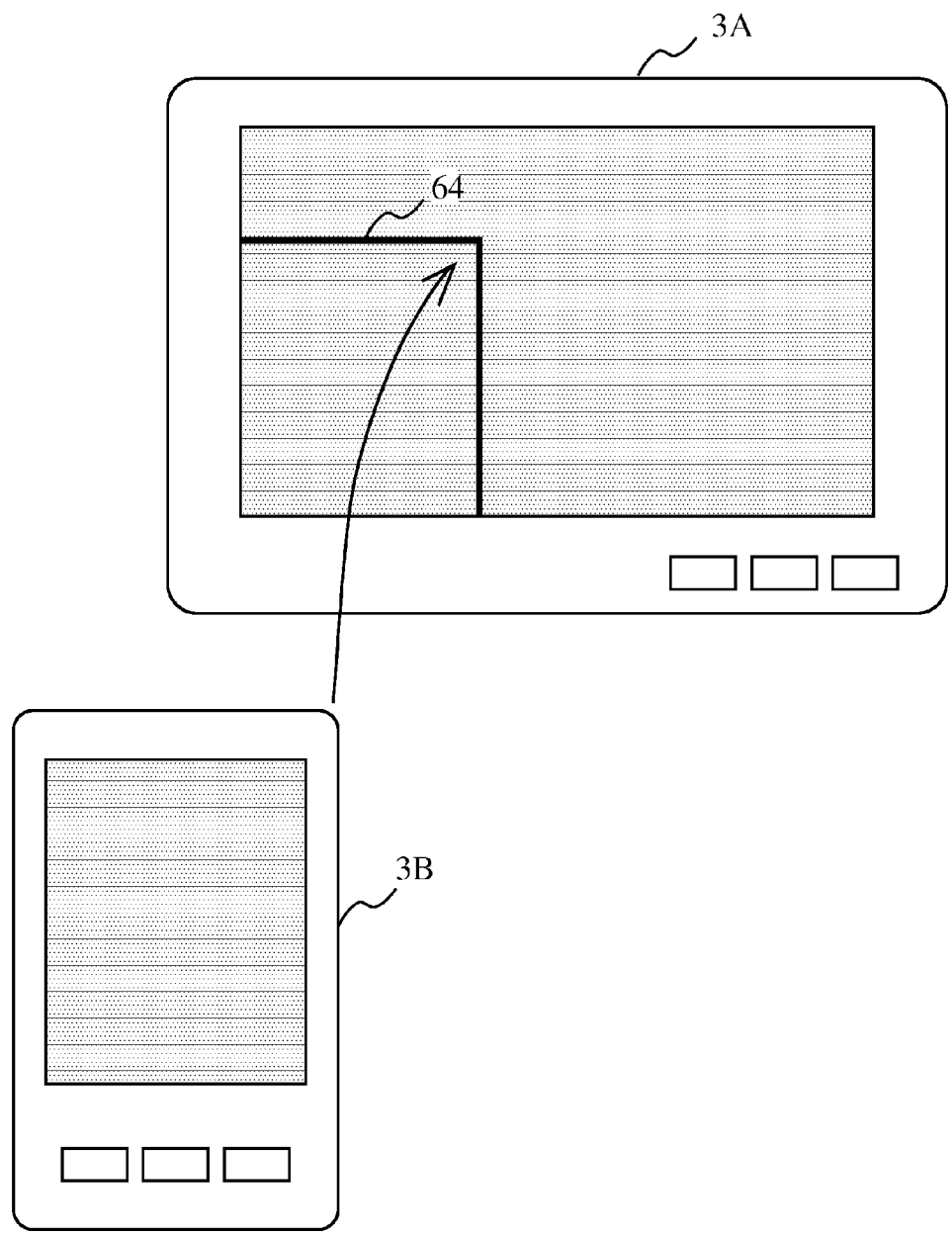
FIG. 18 is a diagram for explaining still another overlapping operation of the indicator 62 and the indicator 63.

Further, as described above, in the case where the coordinate system of the display section 13B can be converted to the coordinate system of the information communication apparatus housing, and the apparatus information storing section 15B stores information about the external dimension of the apparatus housing, an indicator 64 that indicates the outer edge of the housing of the information communication apparatus 3B may be displayed on the screen of the display section 13A as shown in FIG. 18, instead of the above two lines.

It is noted that the configurations described in the above embodiments are realized by dedicated hardware or by execution of a program for realizing such configurations by software. The configurations can be realized by a program execution section such as a central processing unit (CPU) reading, interpreting, and executing a software program stored in a storage medium. The storage medium refers to storage mediums including a semiconductor memory such as a ROM, a RAM, or a flash memory, a magnetic disk memory such as a flexible disk or a hard disk, an optical disc memory such as a CD-ROM, a DVD, or a BD, and a memory card. In addition, the storage medium also has a concept including a communication medium such as a telephone line or a transmission path.

Here, software that realizes the information communication apparatuses of the above embodiments includes the following program. That is, the program causes a computer to read information about the position of the sensor section and information about the position and the size of the display section of the information communication apparatus, stored in a storage medium, and further, information about the reference axis direction of the acceleration sensor, calculate the relative positional relationship of the sensor section and the display section, based on the read information, generate an indicator allowing the position of the sensor section to be specified, and display the generated indicator on the display section.

Alternatively, the program causes a computer to read information about the position of the sensor section and information about the position and the size of the display section of the information communication apparatus, stored in a storage medium, communicate with a target apparatus via a network by using the communication section as an interface, acquire information about the position of the sensor section and information about the position and the size of the display section of the target apparatus, calculate the relative positional relationship of the sensor sections and the display sections between both apparatuses, based on the read information and the acquired information, generate an indicator for providing guidance for overlapping the sensor section of the information communication apparatus and the sensor section of the target apparatus, display the generated indicator on the display section, and transmit, by the communication section, the indicator for providing guidance for overlapping, to the target apparatus.

In addition, each component of the information communication apparatuses of the above embodiments may be implemented as an IC (also referred to as an LSI, a system LSI, a super LSI, an ultra LSI, or the like), which is an integrated circuit. Each component may be separately made as a chip, or some or all of them may be included in one chip. Further, the method of integration is not limited to IC, and may be realized by a dedicated circuit or a general-purpose processor. An FPGA (Field Programmable Gate Array), which is an IC that can be programmed after manufacture, or a reconfigurable processor capable of reconfiguring the connections and the settings of the circuit cells in the IC may also be used.

INDUSTRIAL APPLICABILITY

The present invention is applicable to electronic apparatuses and the like for performing information communication, and particularly, is useful for inter-apparatus authentication and the like upon communication using a short-range communication technique.

DESCRIPTION OF THE REFERENCE CHARACTERS 1, 2, 3A, 3B information communication apparatus
12, 12A, 12B communication section
13, 13A, 13B display section
14, 14A, 14B, 541 sensor section
15, 15A, 15B, 25 apparatus information storing section
151, 151A, 151B sensor section position
152, 152A, 152B display section position
16, 16A, 16B control section
161, 161A, 161B acquisition section
162, 162A, 162B generation section
163, 163A, 163B output section
210, 220, 230, 310 coordinate system
22 substrate
253 sensor section direction
60 to 64 indicator
1101, 1102, 1201, 1202 vector line

The invention claimed is:

1. An information communication apparatus having a display section, the information communication apparatus comprising:
a sensor section used for communication between the information communication apparatus and a target information communication apparatus;
an apparatus information storing section configured to store information about a position of the sensor section in the information communication apparatus and information about a position and a size of the display section in the information communication apparatus;
a communication section configured to communicate with the target information communication apparatus via a network to obtain information about a position of a sensor section in the target information communication apparatus, information about a position and a size of a display section in the target information communication apparatus, and information about external dimensions of a housing of the target information communication apparatus; and
a control section configured to calculate a relative positional relationship of the sensor sections and the display sections between the information communication apparatus and the target information communication apparatus, based on the information about the information communication apparatus and the information about the target information communication apparatus, generate an indicator that indicates an outer edge of the housing of the target information communication apparatus for providing guidance for overlapping the sensor sections between the information communication apparatus and the target information communication apparatus, and display the indicator on the display section in the information communication apparatus.

2. The information communication apparatus according to claim 1, wherein:
the sensor section of the information communication apparatus is an acceleration sensor,
the apparatus information storing section further stores information about a reference axis direction of the acceleration sensor, and
the control section generates an indicator that allows the reference axis direction of the acceleration sensor to be specified, and displays the indicator that allows the reference axis direction of the acceleration sensor to be specified on the display section of the information communication apparatus, together with the indicator that indicates the outer edge of the housing of the target information communication apparatus for providing guidance for overlapping.

3. A system that performs communication between an information communication apparatus and a target information communication apparatus, the information communication apparatus comprising:
a first sensor section used for communication with the target information communication apparatus;
an apparatus information storing section configured to store information about a position of the first sensor section and information about a position and a size of a first display section in the information communication apparatus;
a first receiving section configured to receive from the target information communication apparatus information about a position of a second sensor section in the target information communication apparatus, information about a position and a size of a second display section in the target information communication apparatus, and information about external dimensions of a housing of the target information communication apparatus;
a first control section configured to calculate a relative positional relationship of the first and second sensor sections and a relative positional relationship of the first and second display sections between the information communication apparatus and the target information communication apparatus, based on the information about the information communication apparatus and the information about the target information communication apparatus, generate an indicator that indicates an outer edge of the housing of the target information communication apparatus for providing guidance for overlapping the first sensor section and the second sensor section, and display the indicator on the first display section; and
a first transmitting section configured to transmit, to the target information communication apparatus, the indicator for providing guidance for overlapping; and
the target information communication apparatus comprising:
a second transmitting section configured to transmit, to the information communication apparatus, the information about the position of the second sensor section, the information about the position and the size of the second display section, and the information about the external dimensions of the housing of the target information communication apparatus;
a second receiving section configured to receive, from the information communication apparatus, the indicator for providing guidance for overlapping; and a second control section configured to display, on the second display section, the indicator for providing guidance for overlapping;

wherein the indicator displayed on the first display section and the indicator displayed on the second display section are overlapped upon each other to perform communication between the information communication apparatus and the target information communication apparatus.

4. The information communication apparatus according to claim 3, wherein the indicator for providing guidance for overlapping is two or more lines having an origin at a given position.

5. The information communication apparatus according to claim 4, wherein the two or more lines are discriminated by at least one of color, thickness, and type.

6. The information communication apparatus according to claim 4, wherein the two or more lines are vector lines.

7. The information communication apparatus according to claim 4, wherein the first and second sensor sections are acceleration sensors, the apparatus information storing section further stores information about a reference axis direction of each of the acceleration sensors, and the first control section generates the indicator for providing guidance for overlapping such that the respective reference axis directions of the acceleration sensors of the information communication apparatus and the target information communication apparatus coincide with each other, and displays the indicator for providing guidance for overlapping on the first display section.

8. An indicator display method performed by an information communication apparatus having a sensor section used for communication with a target information communication apparatus, and a display section, the indicator display method comprising the steps of:

acquiring information about a position of the sensor section in the information communication apparatus and information about a position and a size of the display section in the information communication apparatus, from a storage section of the information communication apparatus;

communicating with the target information communication apparatus via a network to obtain information about a position of a sensor section in the target information communication apparatus, information about a position and a size of a display section in the target information communication apparatus, and information about external dimensions of a housing of the target information communication apparatus;

calculating a relative positional relationship of the sensor sections and the display sections between the information communication apparatus and the target information communication apparatus, based on the information about the information communication apparatus and the information about the target information communication apparatus;

generating an indicator that indicates an outer edge of the housing of the target information communication apparatus for providing guidance for overlapping the sensor sections between the information communication apparatus and the target information communication apparatus, based on the calculated relative positional relationship; and displaying the generated indicator on the display section of the information communication apparatus.

9. An indicator display method performed by a system that performs communication between an information communication apparatus and a target information communication apparatus, the indicator display method comprising the steps of:

acquiring information about a position of a first sensor section in the information communication apparatus used for communication with the target information communication apparatus and information about a position and a size of a first display section in the information communication apparatus, from a storage section of the information communication apparatus;

receiving from the target information communication apparatus information about a position of a second sensor section in the target information communication apparatus, information about a position and a size of a second display section in the target information communication apparatus, and information about external dimensions of a housing of the target information communication apparatus;

calculating a relative positional relationship of the first and second sensor sections and a relative positional relationship of the first and second display sections between the information communication apparatus and the target information communication apparatus, based on the information about the information communication apparatus and the information about the target information communication apparatus;

generating an indicator that indicates an outer edge of the housing of the target information communication apparatus for providing guidance for overlapping the first and second sensor sections, based on the calculated relative positional relationships;

displaying the generated indicator on the first display section;

transmitting the indicator for providing guidance for overlapping, to the target information communication apparatus;

displaying the generated indicator on the second display section; and overlapping the indicator displayed on the first display section and the indicator displayed on the second display section upon each other to perform communication between the information communication apparatus and the target information communication apparatus.

* * * * *